Nov. 16, 1937.  F. G. KRAFT  2,099,443
VALVE
Filed Oct. 4, 1935
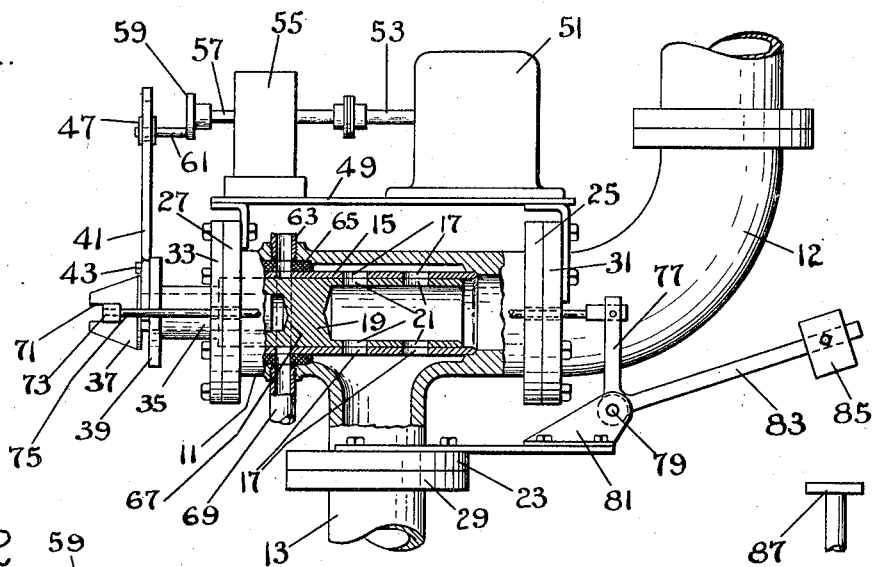
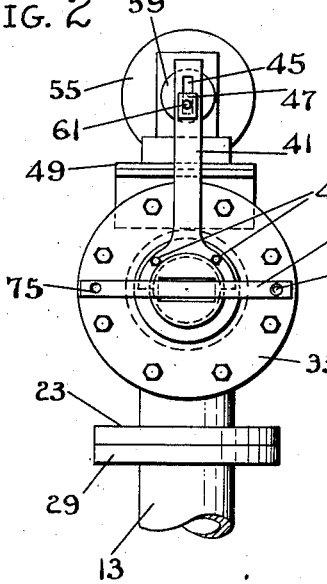
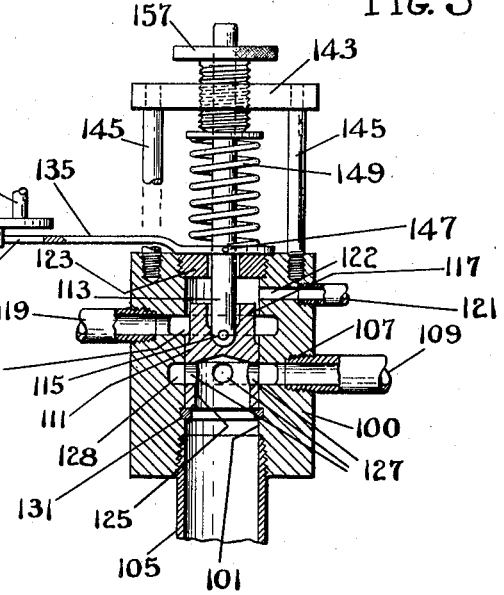
INVENTOR.
Frederick G. Kraft
BY Charles F. Daley
ATTORNEY.

Patented Nov. 16, 1937

2,099,443

UNITED STATES PATENT OFFICE 2,099,443

VALVE

Frederick G. Kraft, Richmond, Va., assignor, by mesne assignments, to E. I. du Pont de Nemours & Company, Wilmington, Del., a corporation of Delaware Application October 4, 1935, Serial No. 43,479

6 Claims. (Cl. 137—111)

This invention relates to improvements in valves and more particularly relates to non-sticking automatic relief or throttling valves adapted to be used with particular advantage in the regulation and control of the flow of liquids which are viscous, gelable, or sticky in nature, and which solidify with aging.

This invention will be described with particular reference to the regulation and control of viscose through pipelines, nevertheless, it will be obvious that the invention has general utility in the control and regulation of the flow of other fluids.

Heretofore in the control and regulation of the flow of viscose, difficulty has been experienced due to sticking or freezing of the valve elements. In automatic relief or throttling valves the cooperating valve elements remain stationary in given positions over a period of time. When such valves are used in pipelines carrying viscose, the cooperating elements will function well for a comparatively short period of time, but after the film of viscose between the cooperating valve element has become gelled due to aging, the valve will no longer be sensitive to small differences in pressure in the pipeline. As a consequence, automatic throttling and relief valves, such as were known prior to this invention, must necessarily be removed and cleaned at relatively short intervals.

It is therefore an object of the present invention to provide automatic throttling or relief valves for use in the regulation and control of liquid which will increase in viscosity or gumminess and may even gel or solidify with time.

It is another object of the present invention to provide automatic throttling or relief valves which will remain sensitive to slight changes in pressure over an extended period of time when used for the regulation and control of the flow of liquid containing substances which will tend to cause an adherence between cooperating elements of said valves.

Other objects of the invention will appear hereinafter.

The objects of the invention can be generally achieved by providing means in automatic throttling or relief valves for continuously maintaining a slight continuous or intermittent motion between the cooperating elements without disturbing the temporary position of said elements relative to each other due to the pressure of the fluid. These valves are furthermore preferably provided with means for removing viscose to prevent stagnation and gelation thereof from between said cooperating elements.

To more clearly set forth the details of the invention, reference is made to the following detailed description taken in connection with the accompanying illustration in which:

Fig. 1 is a side elevational view, partially in section, showing an automatic relief valve constructed in accordance with the invention;

Fig. 2 is an end elevational view of the valve shown in Fig. 1;

Fig. 3 is a side elevational view, partially in section, showing an automatic throttling valve constructed in accordance with the present invention.

Referring to Fig. 1 of the drawing, reference numeral 11 designates a valve body of an automatic pressure relief valve which is positioned between pipelines 12 and 13. A valve sleeve 15, provided with a plurality of ports 17, is rigidly positioned within the valve body 11. A hollowed valve plug 19 is slidably positioned within the sleeve 15. The plug 19 is provided with a plurality of ports 21 which are adapted to cooperate with ports 17 to permit the flow of viscose or other fluids from pipeline 12 to pipeline 13. The valve body 11 is provided with flanges 23, 25 and 27 to which may be attached flange 29 of pipeline 13, flange 31 of pipeline 12 and the head 33 respectively. The plug 19 is provided with a reduced end 35 which is adapted to project through head 33. The reduced end 35 is provided with a fixed collar 39 and a crown 37. A lever 41 is connected to the collar 39 by means of screws 43. This lever is provided at one end thereof with a slot 45 and a cross-head 47 (see Fig. 2), the cross-head being adapted to move within the slot 45.

A frame 49 is connected to the valve body 11 in any desired manner. Mounted on the frame 49 is a motor 51 and a gear reduction box 55 which are connected to each other by means of the shaft 53. The shaft 57, driven by the gear reduction mechanism, is provided with a head 59 upon which is mounted an eccentric pin 61. The pin 61 is adapted to project through a bore in the cross-head 47, and is adapted to impart motion to the cross-head and the lever 41. This motion will rock the plug 19 relative to the sleeve 15 and thereby prevent the formation of a solidified or gelled viscose between the plug and the sleeve.

The valve body 11 is furthermore provided with screw threaded means into which may be threaded an inlet pipe fitting 63 and an outlet pipe fitting 69. These pipe fittings are threaded into the valve body and are preferably screwed down into contact with a packing member 65. A groove 67 surrounding the plug 19 is provided for connecting the inlet and outlet pipes 63 and 69. This groove is cut through one side of sleeve 15 and is adapted to permit the passage of water or other suitable liquid between the sleeve 15 and the plug 19 whereby any aged viscose may be washed from between these two members. The crown 37 is provided with a notch 71 in which may be positioned a bar 73 as is clearly shown in Fig. 2. A pair of rods 75 are connected to the ends of the bar 73, which rods are connected to one arm of a bell crank lever 77. The rods are preferably passed through the flanges 27 and 25 so as to make as compact a unit as possible and to provide a guiding means for said rods. The bell crank lever is pivoted at 79 to a support 81. The other end of the bell crank lever 83 is provided with a weight 85 adjustable along the length of said arm 83. A support 87 is preferably provided below the weight 85 upon which the said weight may rest when the valve is in a closed position.

The operation of this valve is somewhat as follows. The viscose will enter the valve body through the pipeline 12 and exert a pressure against the plug 19. As the pressure builds up above normal, the ports 17 and 21 will tend to coincide with each other and permit discharge of a certain amount of said viscose to relieve the excess pressure thereon. The valve, as shown in Fig. 1, is open to its maximum extent, due to excess pressure in the pipeline 12.

This valve could also be transverted into an automatic throttling valve by passing the viscose into the valve through the pipeline 13. In this case the port openings 17 and 21 would be coincident when the weight 85 was in position on the rest 87. As the pressure in the pipeline 13 increased, the port openings would move away from each other so as to close the valve by reason of the pressure transmitted to the hollowed plug 19. This would tend to produce a uniform pressure in the pipeline 12.

When a pressure equilibrium is reached in the valve the cooperating valve elements 15 and 19 will remain stationary relative to each other and any viscose between said elements will, upon solidification, tend to bind these elements to each other. In the operation of the valve, the slidable plug 19 is oscillated by means of the motor 51 and the gear reduction box 55 and the lever 41 through an arc of a few degrees so that the viscose between the plug 19 and the sleeve 15 will not stagnate and solidify to cause sticking between these two elements. Sufficient clearance should be permitted between the sleeve and plug so that a small amount of viscose will continually leak out and keep these parts lubricated with fresh viscose. Any viscose between the sleeve and plug which may work its way to the head of the valve will be washed therefrom by means of the liquid passing from pipeline 63 to pipeline 69.

Referring to the modified form of throttling valve illustrated in Fig. 3 of the drawing, reference numeral 100 designates a valve block having a cylindrical bore 101 into which is screw-threaded an inlet pipeline 105. The valve block 100 contains an annular groove 128 which is adapted to serve as an outlet for the flow of the viscose from the valve block. An outlet pipeline 109 is screw threaded into the block and connected with the groove 128. A piston-like valve head 111 is positioned within the cylindrical bore 101. The valve head 111 is provided with a skirt 125 which in turn is provided with a plurality of openings 127 to connect the inlet to the outlet pipelines. A valve stem 113 is pivoted to the valve head 111 at 115. A lever 135 is fitted about the valve stem 113 and is fixedly connected thereto by means of a screw 147. The opposite end of the lever 135 is provided with a slot 137 for reception of an eccentric pin 139 which is mounted on a driven shaft 141. The shaft 141 may be driven by any desired means and is adapted to oscillate lever 135 by means of the interposed eccentric pin 139 and slot 137. A spaced guide block 143 is rigidly fixed to the valve block 100 by means of rods 145. The guide block 143 is provided with a screw-threaded, adjustable bushing 157 which in turn is provided with a longitudinal opening therethrough for passage of the valve stem 113, the valve stem being adapted to move longitudinally within the bushing 157. A coil compression spring 149 is positioned between the bushing 157 and the lever 135 for the purpose of compensating for pressure on the valve head 111 tending to push the latter in an upward direction.

The valve block 100 is furthermore provided with a groove 120 positioned circumferentially of the bore 101. The valve head 111 is provided with a reduced section 117 adjacent the groove 120 for a purpose to be hereinafter set forth. An inlet pipeline for a washing liquid is threaded into the valve block 100 and is connected to the groove 120. Water or other suitable washing fluid may be passed from the inlet pipeline 119 into the groove 120 and upwardly around the reduced portion of the valve head 111 and thence to the bore 101 in the valve block 100. The upper portion of the bore 101 in the valve block 100 is closed by means of a packing gland 123 thereby preventing the passage of the water outwardly over the top of the valve block 100. As an outlet means for the water or other suitable fluid, a pipeline 121 is screw threaded into the upper end of valve block 100 and is connected to the bore 101 by means of an opening 122. Consequently any viscose which may work its way upwardly between the valve head 111 and the cylindrical bore 101 will be washed from the valve by means of the water flowing from 119 to 121. A split ring 131 may, if desired, be placed in the lower portion of valve body 100 to limit the downward movement of valve head 111.

When functioning as a throttling valve the viscose will enter through pipeline 109, thence around groove 128 and inwardly through openings 127 into the bore of valve head 111 from there to the outlet pipeline 105. As the pressure increases in pipeline 109, the valve head 111 will tend to be pressed upwardly against the force of the spring 149 and thus tend to narrow the openings between the ports 127 and the groove 128 restricting the pressure from pipeline 109 and maintaining the desired pressure in the pipeline 105.

By reason of the present invention, viscose, or similar viscous or gelable liquids, may be automatically regulated and controlled with the same accuracy and precision as non-viscous and non-gelable liquids. Automatic relief and throttling valves, when constructed in accordance with the present invention, may be used for the regulation and control of viscose over comparatively long periods of time without the necessity of periodic dismantling of the pipelines for the purpose of cleaning and washing such valves.

Obviously, many variations and modifications of the specific embodiment described and illustrated may be made without departing from the nature and spirit of the invention. The invention is therefore not to be limited to the specific details of the disclosed embodiment except as set forth in the appended claims.

I claim:

1. In a valve suitable for use in the control and regulation of viscose and similar fluids, cooperable elements longitudinally movable relatively to each other to effect an opening or closing of said valve, means for continuously oscillating said elements relatively to each other to prevent sticking therebetween, and fluid directing means for passing a cleaning fluid between said elements.

2. In a valve suitable for use in the control and regulation of viscose and similar fluids, cooperable elements movable relatively to each other to effect an opening or closing of said valve, said elements having sufficient clearance between each other to permit a continuous leakage of fluid therebetween, and means for moving said elements relatively to each other to prevent sticking therebetween without substantially effecting an opening or closing of said valve, and fluid directing means for passing a cleaning fluid between said elements.

3. In a valve suitable for use in the control and regulation of viscose and similar fluids, cooperable elements movable relatively to each other to effect an opening or closing of said valve, means for directing the fluid to be controlled against said elements to cause a relative displacement thereof, means tending to force said elements against their relative displacement, means for moving said elements relatively to each other to prevent sticking of said elements to each other, and fluid directing means for passing a cleaning fluid between said elements.

4. In a valve suitable for use in the control and regulation of viscose and similar fluids, cooperable elements movable relatively to each other to effect an opening or closing of said valve, means for directing the fluid to be controlled against said elements to cause a relative displacement thereof, means tending to force said elements against their relative displacement, means for moving said elements relatively to each other to prevent sticking of said elements to each other, said elements having sufficient clearance between each other to permit a continuous leakage of fluid therebetween.

5. In a valve suitable for use in the control and regulation of viscose and similar fluids, cooperable elements movable relatively to each other to effect an opening or closing of said valve, means for directing the fluid to be controlled against said elements to cause a relative displacement thereof, means tending to force said elements against their relative displacement, means for moving said elements relatively to each other to prevent sticking of said elements to each other, said elements having sufficient clearance between each other to permit a continuous leakage of fluid therebetween, and means for removing leakage fluid from between said elements.

6. In a valve suitable for use in the control and regulation of viscose and similar fluids, cooperable elements movable relatively to each other to effect an opening or closing of said valve, means for directing the fluid to be controlled against said elements to cause a relative displacement thereof, means tending to force said elements against their relative displacement, means for moving said elements relatively to each other to prevent sticking of said elements to each other, said elements having sufficient clearance between each other to permit a continuous leakage of fluid therebetween, and fluid directing means for passing a cleaning fluid between said elements.

FREDERICK G. KRAFT.